Figure 1:
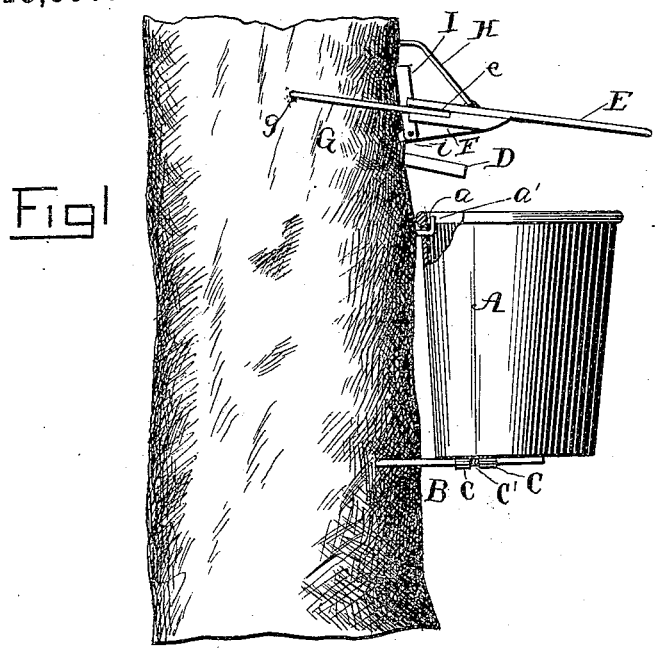

(No Model.)

E. S. WILKINS.
SAP BUCKET AND COVER.

No. 313,397. Patented Mar. 3, 1885.

WITNESSES:
Morris A. Clark
P. B. Turpin

INVENTOR.
Edward S. Wilkins
By R. S. & A. P. Lacey
ATTYS

UNITED STATES PATENT OFFICE.

EDWARD S. WILKINS, OF STOWE, VERMONT.

SAP-BUCKET AND COVER.

SPECIFICATION forming part of Letters Patent No. 313,397, dated March 3, 1885.

Application filed September 8, 1884. (No model.)

*To all whom it may concern:*

Be it known that I, EDWARD S. WILKINS, a citizen of the United States, residing at Stowe, in the county of Lamoille and State of Vermont, have invented certain new and useful Improvements in Sap-Buckets and Covers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to devices used in the drawing of the sap from trees, such as maple, and has for its object simple convenient means whereby water or snow is kept out of the sap bucket and spout, and also devices at the bottom of the bucket by which the same may be held in a vertical position whether the tree be round, flat, or hollowed opposite such part of the bucket.

My invention consists, therefore, in the construction and combination of parts presently described.

Figure 2:
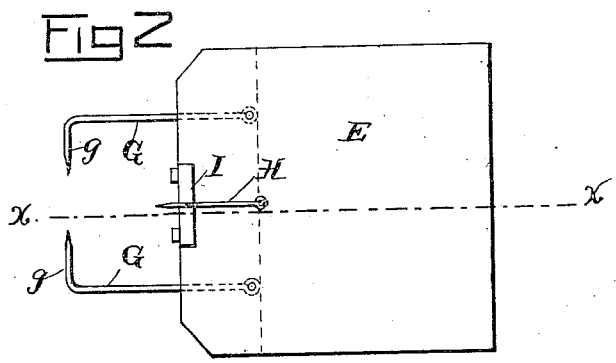
Figure 3:
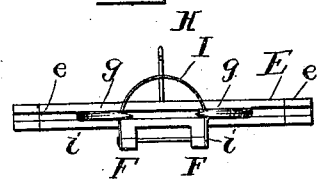
Figure 4:
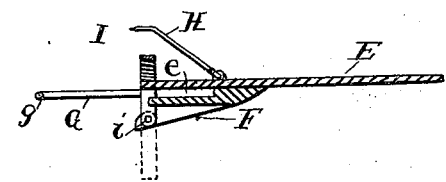
Figure 5:
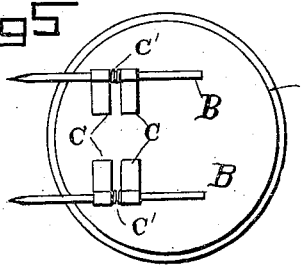

In the drawings, Figure 1 represents a section of a tree with my improvements attached. Fig. 2 is a top plan view of the cover. Fig. 3 is a view of the inner edge thereof. Fig. 4 is a cross-section of the cover on line $x\ x$, Fig. 2. Fig. 5 is a bottom view of the bucket.

The bucket A is provided near its upper end with an eye or opening, $a$, which in use is caught over a hook, $a'$, driven into the tree and supported thereby, as will be understood from Fig. 1. On the bottom of this bucket I secure two or more supporting-rods, B B, which are arranged about parallel to a diametrical line drawn through the hole $a$. The outer ends of these rods are brought to a point to better engage the tree, and they are independently adjustable in the direction of their length along the bottom of the bucket and out beyond the same, as appears in Figs. 1 and 5. By this adjustment I am able to properly set the supports to hold the bucket in a vertical position, no matter whether the tree be large, small, round, flat, or depressed opposite the bucket, and thus enable the complete filling of the bucket, as will be understood. This adjustment is secured by passing each of the rods through keepers C C, and securing a spring on the rods between said keepers. This spring embraces the rods tightly and prevents them from moving freely through the keepers. The spout D is driven into the tree above the bucket, and has its outer end extended over the latter, so as to discharge therein, as will be understood from Fig. 1. This spout is usually of the common open-topped form, though other forms may be employed where desired. The cover in use is arranged above the spout, and held to the tree in the manner presently described. It consists of a broad flat plate, E, under lug or lugs F, securing-hooks G, the brace bar H, and the curved and edged guard I. The plate E is made of proper sizes to completely cover the upper end of the bucket, and has the hooks G pivoted at their inner ends to it, so that they may be swung in the plane of the plate and are rigid as to movement transversely of said plate. These hooks are pivoted in deep slots $e$, formed in the inner edge of the plate E, so as to firmly brace them against the transverse movement above referred to. The outer ends of the hooks G are bent at $g$, and adapted to be forced into the bark of the tree and hold the cover thereto. The lugs F F depend from the lower inner edge of the plate E, and provide a broad bearing therefor.

Midway the sides of the plate E, and at the inner edge thereof, I secure the spout-guard I, formed of a narrow strip of metal curved in the arch form shown, and having its inner edge sharpened, so it may be driven into the bark of the tree. The object of this guard is to prevent water trickling down the side of the tree into the sap-spout or on the same, and be carried out thereby into the bucket. This I secure by arranging the guard over the spout so it will convey the water trickling down the tree to one side of the line of the spout.

For the purposes of the adjustment presently described, I prefer to secure this guard to the cover by pivoting its arms to the cover at $i$, so that its crown portion may be adjusted, as indicated in dotted lines, Fig. 4, so as to enable the accurate application of the guard, no matter what the angle to which the cover may be set.

The brace hook or bar H is pivoted at its lower end on the plate, and has its upper end pointed or otherwise suitably formed to engage the tree. By means of this bar the cover is braced against being forced upward by wind blowing in under the same, as will be understood.

Having thus described my invention, what I claim, and desire to secure by Letters Patent, is—

1. A sap-bucket having attached to its bottom plate keepers and springs, in combination with supporting-rods held by such keepers and springs, whereby they may be adjusted beyond said bucket and held at any desired point of adjustment, substantially as set forth.

2. The combination, with the covering-plate, of the supporting-hooks pivoted at one end to and capable of being swung in the plane of the cover-plate and the brace-bar or hook pivoted at one end on the plate and adapted at its other end to engage the tree, substantially as set forth.

3. A cover-plate provided with means for securing it to a tree, combined with a guard-plate, I, supported on said cover-plate and curved downward toward its opposite ends, the inner edge of said guard-plate being sharpened, substantially as set forth.

4. The combination, with a cover-plate, of a guard, I, curved downward toward its opposite ends and sharpened on its inner edge, the said guard I being pivotally connected to the cover, whereby its upper end may be swung toward and from the tree, substantially as set forth.

5. The herein-described cover consisting of plate E, provided with slots e, the lugs F, the curved guard I, pivoted to the plate, the supporting-rods G, pivoted at one end to plate E in slots e and provided at their other ends with points g, and the brace-bar I, substantially as set forth.

6. The combination, with the covering-plate provided at its inner edge with slots e, of the hooks G, pivoted to the covering-plate within the slot e, whereby the motion of said hooks is confined to the plane of the covering-plate, substantially as set forth.

In testimony whereof I affix my signature in presence of two witnesses.

EDWARD S. WILKINS.

Witnesses:
 CHAS. S. CONANT,
 LEONARD S. THOMPSON.